United States Patent
Chen et al.

(10) Patent No.: US 10,589,559 B2
(45) Date of Patent: Mar. 17, 2020

(54) IMAGE-RECEIVING COMPOSITIONS

(71) Applicant: Hewlett-Packard Development Company, L.P., Fort Collins, CO (US)

(72) Inventors: Tao Chen, San Diego, CA (US); Silke Courtenay, San Diego, CA (US); Bor-Jiunn Niu, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/307,198

(22) PCT Filed: Sep. 13, 2016

(86) PCT No.: PCT/US2016/051513
§ 371 (c)(1),
(2) Date: Dec. 5, 2018

(87) PCT Pub. No.: WO2018/052400
PCT Pub. Date: Mar. 22, 2018

(65) Prior Publication Data
US 2019/0143729 A1     May 16, 2019

(51) Int. Cl.
*B41M 5/52*      (2006.01)
*C09D 11/322*      (2014.01)

(52) U.S. Cl.
CPC ............ *B41M 5/5218* (2013.01); *B41M 5/52* (2013.01); *B41M 5/5236* (2013.01);
(Continued)

(58) Field of Classification Search
CPC .............. B41M 5/5218; B41M 5/5236; B41M 5/5272; B41M 5/5254; C09D 11/322
(Continued)

(56) References Cited

U.S. PATENT DOCUMENTS

| | | | |
|---|---|---|---|
| 6,544,630 B1 | 4/2003 | Missell et al. | |
| 7,815,984 B2 | 10/2010 | Yoshino et al. | |

(Continued)

FOREIGN PATENT DOCUMENTS

| | | |
|---|---|---|
| EP | 0835762 | 4/1998 |
| WO | 0069646 | 11/2000 |

(Continued)

OTHER PUBLICATIONS

Autlov et al., Microcrystalline celulose: structure, properties and applications (review).—Chemistry of plant raw materials, 2013, No. 3, pp. 33-41.
(Continued)

*Primary Examiner* — An H Do
(74) *Attorney, Agent, or Firm* — Thorpe North & Western LLP

(57) ABSTRACT

The present disclosure is drawn to image-receiving compositions that can include an aqueous liquid vehicle and solids dispersed in the aqueous liquid vehicle. The solids can include from 60 wt % to 94 wt % pigment filler, from 0.5 wt % to 15 wt % multivalent salt, from 1 wt % to 10 wt % water-soluble polymer, from 2 wt % to 15 wt % latex, and from 2 wt % to 15 wt % synthetic micronized cellulose. The synthetic micronized cellulose can have a bulk density of from 150 grams per liter to 200 grams per liter, and a surface area of 0.1 $m^2$/g to 10 $m^2$/g.

15 Claims, 1 Drawing Sheet

(52) U.S. Cl.
CPC ........ *B41M 5/5254* (2013.01); *B41M 5/5272* (2013.01); *C09D 11/322* (2013.01)

(58) Field of Classification Search
USPC .......................................... 347/95, 101, 105
See application file for complete search history.

(56) References Cited

U.S. PATENT DOCUMENTS

| | | | |
|---|---|---|---|
| 8,449,665 | B2 | 5/2013 | Pal et al. |
| 9,616,696 | B2 * | 4/2017 | Di Risio .............. B41M 5/5245 |
| 2013/0293647 | A1 * | 11/2013 | Dannhauser ......... B41M 5/0017 347/102 |
| 2015/0140237 | A1 | 5/2015 | Schmidt et al. |
| 2016/0060814 | A1 | 3/2016 | Hauschel et al. |

FOREIGN PATENT DOCUMENTS

| | | |
|---|---|---|
| WO | 03064166 | 8/2003 |
| WO | 2011056178 | 5/2011 |

OTHER PUBLICATIONS

International Search Report dated Jun. 29, 2017 for PCT/US2016/051513, Applicant Hewlett-Packard Development Company, L.P.

* cited by examiner

IMAGE-RECEIVING COMPOSITIONS

BACKGROUND

Inkjet printing technology has expanded its application to high-speed, commercial and industrial printing in addition to home and office usage because of its ability to produce economical, high quality, multi-colored prints. This technology is a non-impact printing method in which an electronic signal controls and directs droplets or a stream of ink that can be deposited on a wide variety of substrates, including media substrates. Inkjet printing technology has found various applications on different substrates including, for examples, cellulose paper, metal, plastic, fabric, or the like. The substrate can be adapted, modified, or coated to improve the overall image quality and/or permanence of the printed images.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Figure 1:
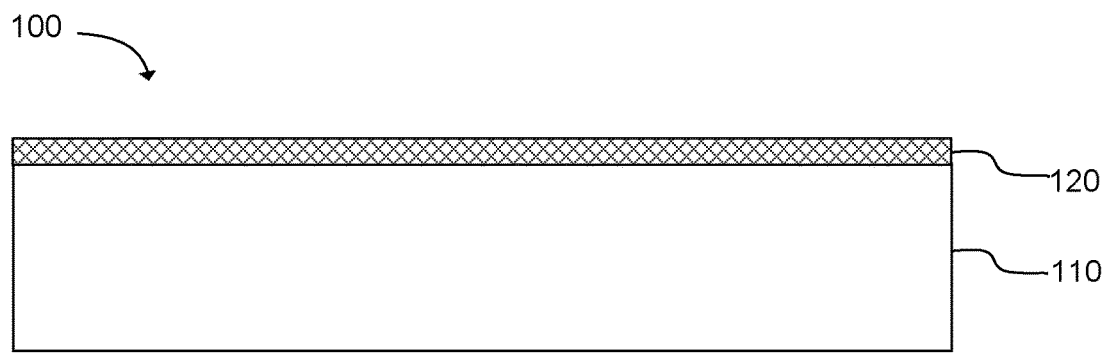
FIG. 1 is an example cross-sectional view of a coated print medium with an image-receiving layer coated on a substrate, such as a media substrate, in accordance with the present disclosure.

Reference will now be made to several examples that are illustrated herein, and specific language will be used herein to describe the same. It will nevertheless be understood that no limitation of the scope of the disclosure is thereby intended.

DETAILED DESCRIPTION

Inkjet printing, particularly high speed inkjet printing, has expanded into markets where the technology is very competitive with more traditional commercial printing technologies, and in many ways is superior to traditional offset printing systems. For example, high speed printing can print images at speeds greater than 200 or 400 feet per minute (fpm). However, printing at such high speeds can, in some cases, compromise image durability and/or quality. The coatings of the present disclosure can be used to ameliorate certain image durability and image quality issues. For example, the coatings of the present disclosure can allow for high speed printing with acceptable quality while remaining durable.

Accordingly, the present disclosure is drawn to image-receiving compositions. The image-receiving composition can include an aqueous liquid vehicle and solids dispersed in the aqueous liquid vehicle. The solids can include from 60 wt % to 94 wt % pigment filler, from 0.5 wt % to 15 wt % multivalent salt, from 1 wt % to 10 wt % water soluble-polymer, from 2 wt % to 15 wt % latex, and from 2 wt % to 15 wt % synthetic micronized cellulose. The synthetic micronized cellulose can have a bulk density of 150 grams per liter (g/L) to 200 g/L, and a surface area of 0.1 to 10 meters squared per gram ($m^2/g$).

In another example, a coated print medium can include a media substrate, and an image-receiving layer applied to the media substrate at a dry coating weight of 3 grams per square meter (gsm) to 20 gsm. The image-receiving layer can include a pigment filler, a multivalent salt, a water-soluble polymer, from a latex, and a synthetic micronized cellulose. The synthetic micronized cellulose can have a bulk density of 150 g/L to 200 g/L, and a surface area of 0.1 $m^2/g$ to 10 $m^2/g$. In certain specific examples, the image-receiving layer can be applied to the media substrate at a coating weight of 5 gsm to 15 gsm. In some additional examples, the synthetic micronized cellulose can have an oil absorptivity of 1.2 grams oil per gram to 2.0 grams oil per gram. In some further examples, the synthetic micronized cellulose can have a water absorptivity of 2 grams water per gram to 4 grams water per gram. In yet other examples, the synthetic micronized cellulose can have a particle length of 6 microns to 9 microns.

In another example, a printing system can include a coated print medium and a high-speed printer for printing ink a print speed of 200 feet per minute to 1000 feet per minute with a minimum ink coverage of 3%. The coated print medium can include a media substrate and an image-receiving layer applied to the media substrate at a dry coating weight of 3 gsm to 20 gsm. The image-receiving layer can include a pigment filler, a multivalent salt, a water-soluble polymer, a latex, and a synthetic micronized cellulose. The synthetic micronized cellulose can have a bulk density of 150 g/L to 200 g/L, and a surface area of 0.1 $m^2/g$ to 10 $m^2/g$. In some specific examples, the high-speed printer can include an aqueous pigment-based ink.

In further detail regarding the image-receiving composition or the image-receiving layers described above, in some examples, the synthetic micronized cellulose can have a length from 2 microns to 12 microns, or from 6 microns to 10 microns. Furthermore, the synthetic micronized cellulose can have an aspect ratio of 5:1 to 10:1, or from 6:1 to 9:1. In yet other examples, the synthetic micronized cellulose can have a bulk density of 160 g/L to 190 g/L. In further detail, the surface area can also be 0.1 $m^2/g$ to 10 $m^2/g$. In other example, the surface area can also be 1 $m^2/g$ to 8 $m^2/g$. In additional examples, the total solids content can include from 3 wt % to 8 wt % of the synthetic micronized cellulose.

With this in mind, the image-receiving compositions, image-receiving layers, and printing system are described in more detail. For example, the image-receiving compositions can include a variety of aqueous liquid vehicles, which may be dried or removed therefrom when applied to a substrate to form an image-receiving layer. In some examples, the aqueous liquid vehicle can be water or can be primarily water (50 wt % water or more). In other examples, the aqueous liquid vehicle can include water and other suitable components such as a surfactant, an organic solvent, the like, or a combination thereof.

Where the aqueous liquid vehicle includes a surfactant, any suitable surfactant can be used. Non-limiting examples can include an anionic surfactant, a cationic surfactant, a non-ionic surfactant, or combinations thereof. Several commercially available nonionic surfactants that can be used can include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), and Dynol™ series (e.g. Dynol™ 607 and Dynol™ 604) manufactured by Air Products and Chemicals, Inc.; fluorinated surfactants, such as those from the Zonyl® family (e.g., Zonyl® FSO and Zonyl® FSN surfactants), manufactured by E. I. DuPont de Nemours and Company; Alkoxylated surfactant such as Tego® Wet 510 manufactured from Evonik; fluorinated PolyFox® nonionic surfactants (e.g., PF159 nonionic surfactants), manufactured by Omnova; or combinations thereof. Suitable cationic surfactants can include, for example, long chain amines and/or their salts, acrylated diamines, polyamines and/or their salts, quaternary ammonium salts, polyoxyethylenated long-chain amines, quaternized polyoxyethylenated long-chain amines, and/or combinations thereof.

Where the aqueous liquid vehicle includes an organic solvent, the organic solvent can be any suitable organic solvent. Non-limiting examples can include methanol, ethanol, trimethylol propane, propanol, butanol, or combinations thereof. Propanal can include 1-propanol and/or 2-propanol (isopropanol). Butanol can include n-butanol, sec-butanol, isobutanol, and/or tert-butanol. In one example, the organic solvent can include acetone, acetonitrile, acetic acid, 1,4-dioxane, pyridine, butanone, methyl acetate, or any other similar solvent. In other examples, the organic solvent can be glycerin, glyceryl triacetate, 2-ethyl-2-hydroxymethyl-1, 3-propanediol, propylene glycol, polyols, diethylene glycol, tetraethylene glycol, polydextrose, 1,5-pentanediol, 2-pyrrolidone, N-methylpyrrolidone, ethoxylated glycerol, polyethylene glycols, or combination thereof. Other example classes of organic solvents that can be used may include a polyol, a polyol ester, a sugar alcohol, or combinations thereof.

The solids of the image-receiving composition can be dispersed in the aqueous liquid vehicle. As mentioned, the solids can include a pigment filler, a multivalent salt, a water-soluble polymer, a latex, and a synthetic micronized cellulose.

Any suitable pigment filler can be used. The pigment fillers can be either inorganic and/or organic particulates. The pigment fillers can be in solid powder form or they can be dispersed in a slurry. Some non-limiting examples of inorganic pigment fillers can include aluminum silicate, kaolin clay, a calcium carbonate, silica, alumina, boehmite, mica, talc, or combinations thereof. In some examples, the inorganic pigment filler can include clay or a clay mixture. The inorganic pigment filler can include a calcium carbonate or a calcium carbonate mixture. The calcium carbonate can be ground calcium carbonate (GCC), precipitated calcium carbonate (PCC), modified GCC, modified PCC, or a combination thereof. In some examples, the inorganic pigment fillers can include a mixture of a calcium carbonate and clay. In some examples, the inorganic pigment filler can include two different calcium carbonate pigments (e.g., GCC and PCC, for example).

In some specific examples, the pigment fillers can include silica gel (e.g., Silojet®703C available from Grace Co.), modified (e.g., surface modified, chemically modified, etc.) calcium carbonate (e.g., Omyajet®B6606, C3301, and 5010, all of which are available from Omya, Inc.), precipitated calcium carbonate (e.g., Jetcoat®30 available from Specialty Minerals, Inc.), or combinations thereof.

The pigment filler can have a range of particle sizes. In one example, the pigment filler can have a particle size ranging from 0.1 µm to 20 µm. In some examples, the pigment filler can have a particle size ranging from 0.2 µm to 18 µm. In some other examples, the pigment filler can have a particle size ranging from 0.5 µm to 15 µm.

In one example, the pigment filler can be present at a dry amount of the image-receiving composition or image-receiving layer ranging from 60 wt % to 94 wt %, or from 60 wt % to 90 wt %, or from 70 wt % to 85 wt %.

The image-receiving composition can also include a multivalent salt. A number of multivalent salts can be used. In some examples, the multivalent salt can include a magnesium salt, a calcium salt, a barium salt, a zinc salt, an aluminum salt, the like, or a combination thereof. Non-limiting examples, can include calcium chloride, calcium acetate, calcium nitrate, magnesium chloride, magnesium acetate, magnesium nitrate, magnesium sulfate, barium chloride, barium nitrate, zinc chloride, zinc nitrate, aluminum chloride, aluminum hydroxychloride, aluminum nitrate, the like, or a combination thereof. In some specific examples, the multivalent salt can be calcium chloride, magnesium chloride, barium chloride, zinc chloride, aluminum chloride, or a combination thereof.

The multivalent salt can be present at a dry amount of the image-receiving composition or image-receiving layer ranging from 0.5 wt % to 15 wt %, or from 1 wt % to 7 wt %, or from 1.5 wt % to 5 wt %.

The image-receiving composition can also include a water-soluble polymer. Non-limiting examples of a water-soluble polymer can include polyvinyl alcohol (examples of which include Kuraray poval®235, Mowiol®40-88, Mowiol®4-98, and Mowiol®20-98 available from Kuraray America, Inc.), a starch (such as oxidized starch, cationized starch, esterified starch, enzymatically denatured starch, and so on), gelatin, casein, soybean protein, cellulose derivaties (examples of which include carboxymethyl cellulose, hydroxymethyl cellulose, hydroxyethyl cellulose, hydroxypropyl cellulose, etc.), polyvinylpyrrolidone, or combinations thereof. In some examples, the water-soluble polymer does not include a starch.

The water-soluble polymer can be present at a dry amount of the image-receiving composition or image receiving layer ranging from 1 wt % to 10 wt %, or from 1.5 wt % to 7 wt %, or from 2 wt % to 5 wt %.

The image-receiving composition can also include a latex. Non-limiting examples of suitable latexes can include a styrene-butadiene emulsion, acrylonitrile-butadiene latex, vinyl acetate emulsion, an acrylic emulsion, a vinylidene chloride emulsion, a polyester emulsion, or a combination thereof.

The latex can be present at a dry amount of the image-receiving composition or image-receiving layer ranging from 2 wt % to 15 wt %, or 3 wt % to 15 wt %, or 4 wt % to 10 wt %.

The image-receiving composition can also include a synthetic micronized cellulose fiber. Any synthetic micronized cellulose fiber having the properties described herein can be used. A suitable synthetic micronized cellulose fiber can be characterized by a variety of properties, such as length, aspect ratio, bulk density, surface area, oil absorptivity, water absorptivity, etc.

The synthetic micronized cellulose can be present in the image-receiving composition (by solids) or image-receiving layer at from 2 wt % to 15 wt %, from 3 wt % to 10 wt %, or from 4 wt % to 8 wt %.

In one example, the synthetic micronized cellulose fiber can have a length of from about 2 microns to about 12 microns, or from about 6 microns to about 10 microns.

In another example, the synthetic micronized cellulose fiber can have an aspect ratio of from about 5:1 to about 10:1 length to width or diameter. In some other examples, the synthetic micronized cellulose fiber can have an aspect ratio of from about 6:1 to about 9:1 length to width or diameter.

In another example, the synthetic micronized cellulose fiber can have a bulk density of from about 150 grams per liter (g/L) to about 200 g/L. In yet other examples, the synthetic micronized cellulose fiber can have a bulk density of from about 160 g/L to about 190 g/L.

In additional examples, the synthetic micronized cellulose fiber can have a surface area of 0.1 m²/g to 10 m²/g, or in more detailed examples, from 1 m²/g to 8 m²/g.

In further examples, the synthetic micronized cellulose fiber can have an oil absorptivity of from about 1.2 grams of oil per gram of cellulose fiber to about 2.0 grams of oil per gram of cellulose fiber. In other examples, the synthetic micronized cellulose fiber can have an oil absorptivity of from about 1.4 grams of oil per gram of cellulose fiber to about 1.8 grams of oil per gram of cellulose fiber. In other examples, the synthetic micronized cellulose fiber can have an oil absorptivity of from about 1.5 grams of oil per gram of cellulose fiber to about 1.7 grams of oil per gram of cellulose fiber.

In another example, the synthetic micronized cellulose fiber can have a water absorptivity of from about 1 gram of water per gram of cellulose fiber to about 6 grams of water per gram of cellulose fiber. In other examples, the synthetic micronized cellulose fiber can have a water absorptivity of from about 2 grams of water per gram of cellulose fiber to about 4 grams of water per gram of cellulose fiber. In other examples, the synthetic micronized cellulose fiber can have a water absorptivity of from about 2.5 grams of water per gram of cellulose fiber to about 3.5 grams of water per gram of cellulose fiber.

In one specific example, the image-receiving composition can be prepared in a high shear mixer. The image-receiving composition can include about 100 parts Hydrocarb® 60 (available from Omya NA), 3.5 parts calcium chloride (available from Aldrich, Inc.), 4.5 parts Mowial® 4-98 (available from Kuraray), 7 parts Litex™ PX9550 (available from Synthomer), and 5 parts Arbocel® UFC (available from J. Rettenmaier & Söhne). Ranges outside of this specific example can be prepared in accordance with the ranges and principles described herein.

In further detail, as illustrated in FIG. 1, the image-receiving composition can be used to coat an image-receiving layer 120 on a substrate 110, such as a media substrate, to prepare a coated print medium 100. Any suitable substrate can be used to prepare the coated print medium. The image-receiving layer can be a single layer or multiple layers with the same or different coating compositions. The total coat weight of the image-receiving layer can fall within any suitable range. In one example, the dry coating weight can be from about 3 gram per square meter (gsm) to about 20 gsm. In another example, the dry coating weight can range from about 5 gsm to about 15 gsm. Application of the coating can be by any method known in the art, including Meyer rod applicator, knife coating applicator, curtain coating applicator, or the like. Once coated, the image-receiving composition dries to form the image-receiving layer. In some examples, the thickness of the image-receiving layer ranges from about 5 microns (μm) to about 40 microns (μm).

The coated print medium can have an image printed thereon at high speeds, such as speeds greater than 200 fpm, or greater than 400 fpm, and still maintain good image durability. For example, the coated print medium can be provided with a high-speed printer having a print speed of from about 200 feet per minute (fpm) to about 1000 fpm with a minimum ink coverage of 3%. Non-limiting examples of such high-speed printers can include HP T260M, HP T200 Color Series, HP T400 Mono Series, HP T400 Color Series, and HP T1100S, available from HP Inc.

Figure 2:
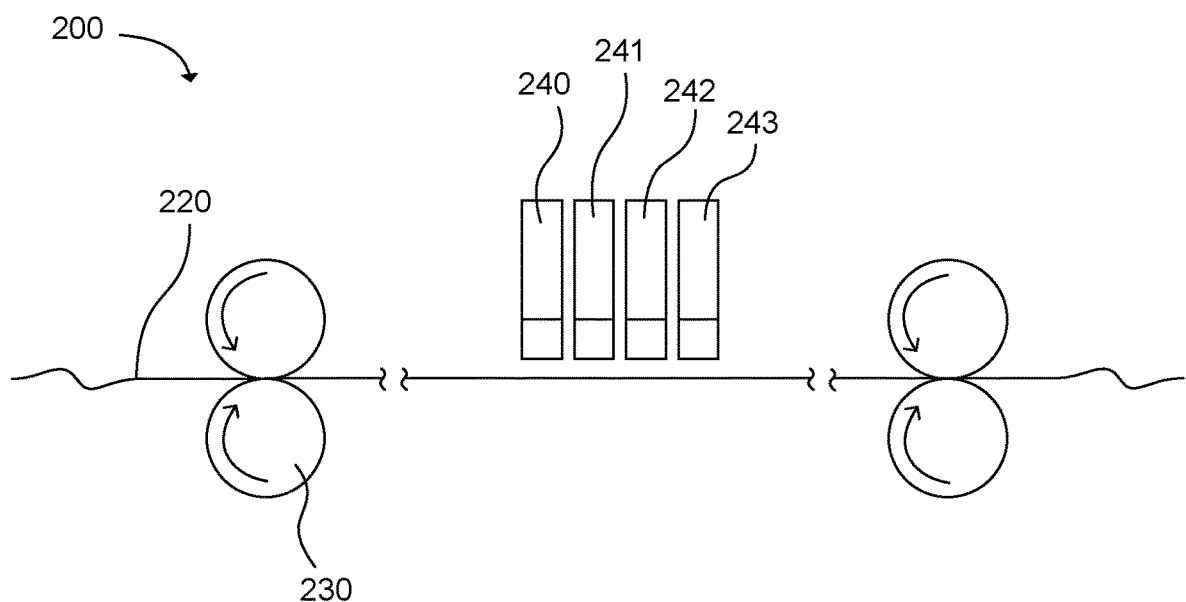
FIG. 2 is simplified schematic view of an example high-speed printer in accordance with the present disclosure.

FIG. 2 illustrates a simplified schematic view of a high-speed printer 200. As illustrated in the figure, the high-speed printer can include a conveyer or roller 230 to compel the coated print medium 220 into and through the printer. Further, the high-speed printer can include a number of inkjet pens or print heads, such as pens or print heads 240, 241, 242, 243, to deposit ink onto the coated print medium. In one example, the high speed printer can be a roll-to-roll printer (media dispensing and receiving rollers not shown). The inkjet pens or print heads can be used to print a number of different colors, such as cyan, magenta, yellow, black, blue, green, red, purple, orange, gray, etc. Further, while not illustrated, the high-speed printer can include a number of additional features, such as a dryer, an ink supply, a controller, a user interface, etc.

Further, in some examples, the high-speed printer can include an aqueous pigment-based ink. Any suitable aqueous pigment-based ink can be used. In some examples, the ink can include a dispersant that is separate (but associated with) the pigment, or the dispersant can be attached to a surface of the pigment, e.g., self-dispersed pigment. For example, the pigment can be dispersed with an attached polymer, oligomer, or small molecule; or can be dispersed with a separate dispersant, such as a polymer dispersant.

The pigment can be suspended in an ink vehicle, which may include water, organic co-solvent, surfactant, latex, biocide, viscosity modifiers, sequestering agents, water soluble polymers, and/or the like. Other ingredients that often are included in ink formulations may also be included in the ink vehicle.

It is noted that, as used in this specification and the appended claims, the singular forms "a," "an," and "the" include plural referents unless the content clearly dictates otherwise.

"Substrate" includes any base material that can be coated in accordance with examples of the present disclosure, such as film base substrates, polymer substrates, conventional paper substrates, photobase substrates, offset media substrates, metal, glass, or the like. "Media substrate" includes substrates that are used as print media, and typically include more specific substrates, such as paper, polymer film, etc. Further, pre-coated and film coated substrates can be considered a "substrate" that can be likewise be coated in accordance with examples of the present disclosure.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the image-receiving compositions, the image-receiving layer, and the printing system, each of these discussions can be considered applicable to each of these examples, whether or not they are explicitly discussed in the context of that example. Thus, for example, in discussing details about the image-receiving compositions per se, such discussion also refers to the coated print medium and the printing system described herein, and vice versa.

The following illustrates an example of the disclosure. However, it is to be understood that this example is merely exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

EXAMPLE

Example 1

Image-Receiving Layer

The following image-receiving composition was prepared to coat onto a media substrate:

TABLE 1

IMAGE-RECEIVING COMPOSITION* OR IMAGE-RECEIVING LAYER FORMULATIONS

| Ingredient | Description | Amount (Parts by Weight) |
| --- | --- | --- |
| Hydrocarb ® 60 from Omya NA | Calcium Carbonate | 100 |
| Mowiol ® 4-98 from Kuraray | Polyvinyl Alcohol | 4.5 |
| Litex ™ PX9550 from Synthomer | Styrene-butadiene | 7 |
| CaCl$_2$ from Aldrich, Inc. | Multivalent Salt | 3.5 |
| Arbocel ® UFC from J. Rettenmaier & Söhne (JRS) | Micronized Cellulose | From 0 to 8 (See Table 3) |

*Image-Receiving Composition also includes a water-based liquid vehicle which is not included in the solids content parts by weight values shown above. The Image-Receiving Layer is devoid or essentially devoid of the liquid vehicle, e.g., applied to a substrate and dried.

The image-receiving composition was applied to the media substrate samples at a coat weight of 10 gsm (by solids) using a Meyer rod. Once dried, the remaining solids formed the image-receiving layer. The coated media substrates were then printed using an HP CM8060 MFP using web press inkjet inks (A50). The prints were prepared in a 2 pass/6 dry spin mode. After printing, the various prints were tested for durability using the following methods:

Finger Smudge: A finger is placed on the printed media substrate with sufficient force to cause a bend in the knuckle. The finger is then drawn down across the printed feature.

Eraser Durability: A pencil eraser is mounted on a force spring to provide a consistent and reproducible pressure. After pressing the erasure against the printed media substrate, the erasure is drawn down across the printed image.

The prints were visually rated according to a 1-5 scale as described in Table 2:

TABLE 2

| VALUE | MEANING |
| --- | --- |
| 5 | No Damage |
| 4 | Very Slight Damage |
| 3 | Some Ink Removal |
| 2 | >50% of Ink Removed |
| 1 | White Media Substrate Visible, Substantial/Total Ink Removal |

The results of the finger smudge and eraser durability tests are illustrated in Table 3:

TABLE 3

|  | Control | Example 1 | Example 2 | Example 3 |
| --- | --- | --- | --- | --- |
| Arbocel ® UFC (Parts by Weight) | 0 | 3 | 5 | 8 |
| Finger Smudge | 2 | 3 | 4.5 | 4.5 |
| Eraser Durability | 2 | 3 | 4.5 | 4.5 |

These results show that the inclusion of micronized cellulose in the image-receiving layer can provide much improved image durability for the printed media substrate.

This technology has been described with reference to certain examples, and those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An image-receiving composition, comprising:
   an aqueous liquid vehicle; and
   solids dispersed in the aqueous liquid vehicle, the solids comprising:
      from 60 wt % to 94 wt % pigment filler,
      from 0.5 wt % to 15 wt % multivalent salt,
      from 1 wt % to 10 wt % water-soluble polymer,
      from 2 wt % to 15 wt % latex, and
      from 2 wt % to 15 wt % synthetic micronized cellulose, said synthetic micronized cellulose having a bulk density of 150 grams per liter to 200 grams per liter, and a surface area of 0.1 m$^2$/g to 10 m$^2$/g.

2. The image-receiving composition of claim 1, wherein the synthetic micronized cellulose has a length from 2 microns to 12 microns.

3. The image-receiving composition of claim 1, wherein the synthetic micronized cellulose has an aspect ratio of 5:1 to 10:1.

4. The image-receiving composition of claim 1, wherein the synthetic micronized cellulose has a bulk density of 160 grams per liter to 190 grams per liter.

5. The image-receiving composition of claim 1, wherein the solids comprises from 3 wt % to 8 wt % of the synthetic micronized cellulose.

6. The image-receiving composition of claim 1, wherein the pigment filler comprises aluminum silicate, kaolin clay, calcium carbonate, silica, alumina, boehmite, mica, talc, or combination thereof.

7. The image-receiving composition of claim 1, wherein the water-soluble polymer comprises polyvinyl alcohol, modified polyvinyl alcohol, starch, modified starch, gelatin, casein, soybean protein, carboxymethyl cellulose, hydroxyethyl cellulose, polyvinylpyrrolidone, or combination thereof.

8. The image-receiving composition of claim 1, wherein the latex comprises styrene-butadiene emulsion, acrylonitrile-butadiene latex, vinyl acetate emulsion, an acrylic emulsion, a vinylidene chloride emulsion, a polyester emulsion, or combination thereof.

9. A coated print medium, comprising:
- a media substrate; and
  - an image-receiving layer applied to the media substrate at a dry coating weight of 3 gsm to 20 gsm, wherein the image-receiving layer comprises:
  - a pigment filler,
  - a multivalent salt,
  - a water-soluble polymer,
  - a latex, and
  - a synthetic micronized cellulose, said synthetic micronized cellulose having a bulk density of 150 grams per liter to 200 grams per liter and a surface area of 0.1 $m^2/g$ to 10 $m^2/g$.

10. The image-receiving layer of claim 9, wherein the image-receiving layer is applied to the media substrate at a coating weight of 5 gsm to 15 gsm.

11. The image-receiving layer of claim 9, wherein the synthetic micronized cellulose has an oil absorptivity of 1.2 grams oil per gram to 2.0 grams oil per gram.

12. The image-receiving layer of claim 9, wherein the synthetic micronized cellulose has a water absorptivity of 2 grams water per gram to 4 grams water per gram.

13. The image-receiving layer of claim 9, wherein the synthetic micronized cellulose has a particle length of 2 microns to 12 microns and an aspect ratio of 5:1 to 10:1.

14. A printing system, comprising:
- a coated print medium, comprising:
  - a media substrate, and
  - an image-receiving layer applied to the media substrate at a dry coating weight of 3 gsm to 20 gsm, wherein the image-receiving layer comprises:
  - a pigment filler,
  - a multivalent salt,
  - a water-soluble polymer,
  - a latex, and
  - a synthetic micronized cellulose, said synthetic micronized cellulose having a bulk density of 150 grams per liter to 200 grams per liter, and a surface area of 0.1 $m^2/g$ to 10 $m^2/g$; and
- a high-speed printer for printing ink at a print speed of 200 feet per minute to 1000 feet per minute with a minimum ink coverage of 3%.

15. The printing system of claim 14, wherein the ink is an aqueous pigment-based ink.

* * * * *